Aug. 12, 1941.    C. M. WARE    2,252,311
SCALE AND RULER
Filed June 27, 1939

C. M. Ware INVENTOR.

Patented Aug. 12, 1941

2,252,311

UNITED STATES PATENT OFFICE 2,252,311

SCALE AND RULER

Charles Myron Ware, Salt Lake City, Utah

Application June 27, 1939, Serial No. 281,374

4 Claims. (Cl. 33—111)

The objects of my inventions of improvements to scales and rulers are:

To devise a protected more permanent graduated surface which will prevent the markings from being worn away.

A further object is to provide a measuring scale which will be formed with the indicia set in the angled juncture of the sidewalls where they are joined together and the indicia are thus protected from outside effects such as wear, weather, or disfigurement such as may be caused by colored inks, pencils and the like.

A still further object is to provide a measuring scale formed of transparent material so formed that when in use the indicia are protected yet set adjacent the work being done.

Another object of this invention is to provide an opaque background for scales, indicia or figures where the figures are formed or carried within the body of the scale instead of on the surface.

The nature of the improvements to attain the above objects is as follows:

1. To mark the figures or marks on the under side, or beneath a transparent covering or to insert a marked piece beneath a transparent covering. This to be done in such a way that the wearing surface is not the marked surface.

2. To arrange by attachments, or by shaping the scale, a tilting fulcrum. Plugs could be inserted for this purpose, or a raised line of contact by moulding or shaping the ruler. This can be arranged so the scale or ruler will normally rest in either tilted position without being held in either position.

3. By coloring each scale or side or part of the side a different color; or to have a rotating extension on the end with a pointer which can be placed to indicate any of the desired scales without interfering with the use of any of the other scales.

Figure 2:
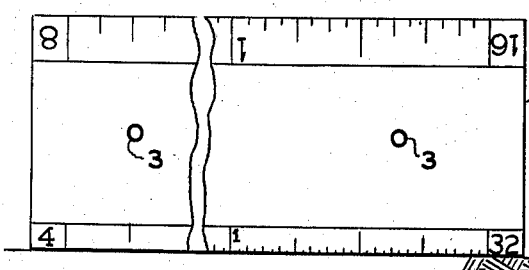
Figure 2 is a face view of the scale.
Figure 1:
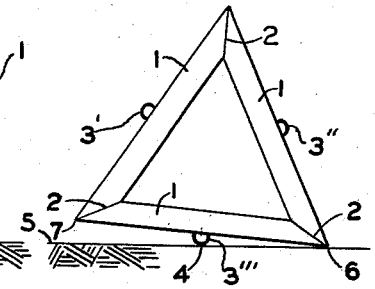
Figure 1 is an end view of my scale.

Detailed description:

Figure 1 and Figure 2 show a scale made up of three separate, transparent sides, 1, 1, 1. The varied scales are marked on the polished faces 2, 2, 2. These faces are glued together using an opaque adhesive for background to the figures or letters. The adhesive can be colored with some color contrasting to the markings. By this arrangement the scales are located within a protecting exterior. An occasional polishing can renew the scales as good as new for the markings will not be worn off. Into holes drilled in 1, can be inserted plugs 3, which extend just enough to create tilting points 4, on the plane surface 5. Using edge 6, as a measuring edge or edge 7, as a ruling edge. By tilting on point 4, edge 6, can be made a ruling edge and edge 7, a measuring edge. These knobs can be colored 3'—red 3"—blue, 3'''—green or some other contrasting color so the user can pick up the scale from a remote part of his desk and at a glance place the desired scale in the proper position.

Figure 4:
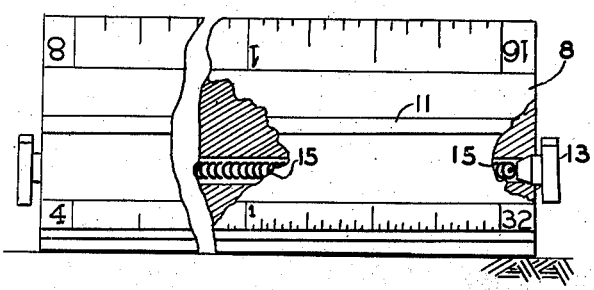
Figure 4 is a face view of Figure 3 parts cut away.
Figure 3:
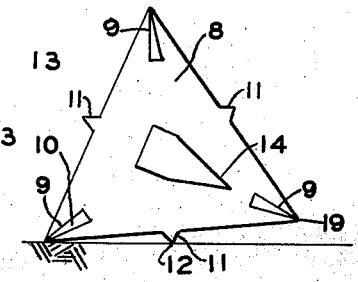
Figure 3 is an end view of a modified type of scale.

Figure 3 and Figure 4 illustrate a moulded transparent case 8, which has slots 9. Into these slots opaque printed scales 10, are inserted. These scales are marked and then secured in the slots using a transparent adhesive. This illustrates another method of applying the principle of having the scale protected from excessive wear by having it beneath the wearing surface.

The cast triangular extension 11, can be colored to aid the user in locating the scale he wishes to use.

The scale can be tilted on the line 12, to make edge 19, a measuring edge or a ruler edge as desired.

The inserted knob 13, has a pointer 14, which can be rotated on the tension of the spring 15, to indicate the scale to be used. This knob does not interfere with using any of the other scales.

Figure 6:
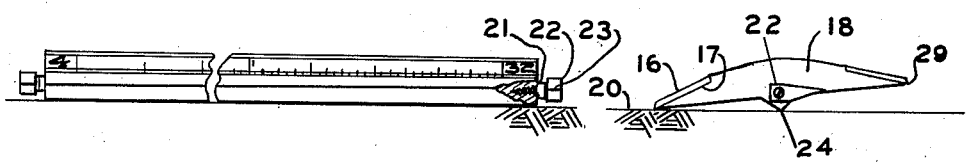
Figure 6 is an edge view of Figure 5.
Figure 5:
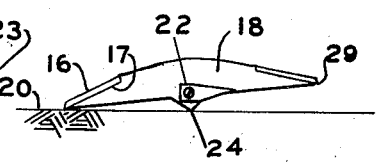
Figure 5 is an end view of a further modified type of scale.

Figure 5 and Figure 6 show the application of the principles of improvements as they might apply to a flat type scale.

A scale is marked directly on the under side 17, of a transparent protective covering 16. An adhesive of contrasting color to the lettering on the transparent covering is used to secure the covering 16 to the body 18. This body is cut in such a shape that it can tilt on edge 24 so edge 29 can be used for a measuring or a marking edge on the plane surface 20. In the end of the body 18 can be secured an immovable hub 21 on which knob 22 can be rotated placing the indicator 23 in a position to indicate the scale being used and at the same time not interfering with the use of the other scales.

I claim:

1. A scale of the class described comprising, a body made of three like-formed sections of transparent material having their abutting edges beveled to secure them together to form a scale which is triangular in cross section; and indicia marked in the beveled edges to be visible through the sides of the body when secured together.

2. A device as set out in claim 1 in which the indicia are formed on an opaque background.

3. A scale of the class described comprising a body made of sections of transparent material having their abutting edges beveled to secure them together to form a scale which is triangular in cross section; indicia marked in the beveled edges; a coating of opaque material over the indicia so that they may be visible from only one side of the scale; when all three sections are secured together.

4. A scale of the class described comprising a body formed triangular in cross section of transparent material having longitudinal slots in said body bisecting each angled edge thereof; and opaque scales inserted into said slots, said scales carrying the indicia on both surfaces thereof to be transparent or visible from each surface of the scale.

C. M. WARE.